Aug. 20, 1968 — L. R. COLE — 3,397,468
VISUAL AID TEACHING DEVICE
Filed July 26, 1966
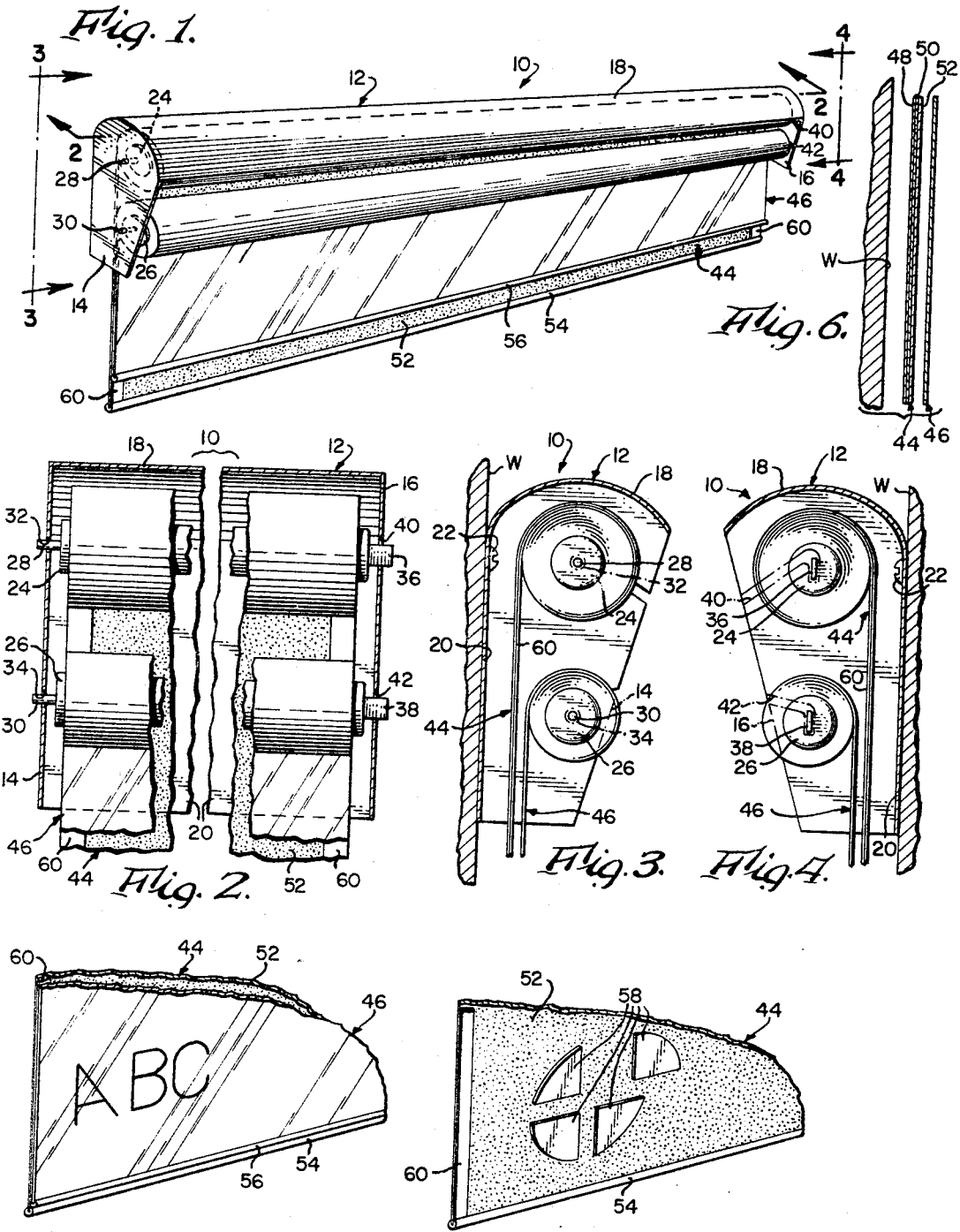
INVENTOR.
Lawrence R. Cole
BY
Popp and Sommer
ATTORNEYS

United States Patent Office 3,397,468
Patented Aug. 20, 1968

3,397,468
VISUAL AID TEACHING DEVICE
Lawrence R. Cole, 315 Beattie Ave.,
Lockport, N.Y. 14094
Filed July 26, 1966, Ser. No. 567,928
10 Claims. (Cl. 35—63)

This invention relates to a new and improved visual aid teaching device, and more particularly to one which is adapted to be secured to a support such as a structural wall for use in place of a conventional blackboard.

A primary object of the present invention is to provide a new and improved visual aid teaching device as a more effective and efficient replacement for a conventional blackboard normally employed in schools or like locations of instruction, thereby resulting in not only the elimination of the blackboard, but also the chalk normally required, as well as the time, effort and dust problems associated with erasing such blackboard. To this end, the inventive teaching device includes a flexible translucent impression sheet and a flexible opaque backing sheet, each wound upon a roller and unwindable therefrom to an extended position adjacent each other. The backing sheet is provided with a pressure sensitive but non-removable, adhesive surface to which the adjacent surface of the impression sheet can be removably adhered by pressure selectively applied against the opposite surface of the impression sheet, such as by a stylus, to form indicia visible through the adhered portions of the impression sheet. These indicia can be erased by stripping the impression sheet from the backing sheet, whereupon the inventive device is ready for reuse.

Another object is to provide such a teaching device wherein the impression sheet, while translucent, is sufficiently reflective for use as a photographic viewing screen, when unwound to an extended position.

A further object is to provide such a teaching device wherein the backing sheet is useable, when unwound alone to an extended position, to expose its adhesive surface, to which various non-adhesive media can be removably adhered by pressing such media against such adhesive surface.

Still another object is to provide such a teaching device which is simple in construction and easy to manufacture, as well as effective and efficient in use.

Additional objects and advantages of the invention will become apparent upon consideration of the following detailed description and accompanying drawings, wherein:

FIG. 1 is a front perspective view of a visual aid teaching device constituting a preferred embodiment of the present invention;

FIG. 2 is an enlarged fragmentary longitudinal sectional view taken on line 2—2 of FIG. 1;

FIGS. 3 and 4 are enlarged, opposite end views taken along the correspondingly numbered lines of FIG. 1, and illustrating the adjacent housing end panel is phantom as well as the manner in which the housing is secured to a support such as an upright structural wall;

FIG. 5 is a fragmentary perspective view showing the front impression sheet and the rear adhesive backing sheet in juxtaposed extended position and in use to form indicia;

FIG. 6 is an enlarged fragmentary vertical sectional view illustrating the cross-sectional structure of the impression and backing sheets in extended position adjacent a structural wall, and FIG. 7 is a view similar to FIG. 5, but illustrating only the backing sheet in extended position for use in conjunction with non-adhesive geometric media removably adhered thereto.

Referring to the drawings, and particularly FIG. 1, a preferred embodiment of the inventive visual aid teaching device is generally indicated at 10, and includes a horizontally elongated housing 12 made of any suitable material such as metal or plastic. Housing 12 includes a pair of longitudinally spaced end wall brackets 14, 16 connected by an outwardly convex, arcuate top wall 18 merging with a flat, vertical rear wall 20. As best seen in FIGS. 3 and 4, rear housing wall 20 is adapted to lie flat against and be secured to a flat support, such as an upright structural wall W, by suitable fastening means such as screws 22.

As also seen in FIG. 2, a pair of elongated, self-winding upper and lower rollers 24, 26 respectively are removably and rotatably mounted in brackets 14, 16 in vertically spaced and alined, substantially parallel horizontal relation. Rollers 24, 26 are provided at their left ends with cylindrical shafts 28, 30 respectively fixed thereto and extending rotatably through vertically spaced and alined upper and lower circular through openings 32, 34 respectively in bracket 14, and at their right ends, rollers 24, 26 are provided with resiliently biased, flat pintles 36, 38 extending through frontwardly open, vertically spaced and alined slots 40, 42 respectively in bracket 16.

As best shown in FIG. 4, lower slot 42 slants upwardly to the front, while upper slot 40 slants downwardly to the front for facilitating mounting and demounting of their respective rollers, while the closed vertical inner end portion of each slot effectively prevents rotation of the pintle therein. The self-winding structure of rollers 24, 26 is preferably like that of conventional window shade rollers, and hence no further description thereof is necessary.

A flexible, opaque backing sheet 44 is wound clockwise upon upper roller 24, as shown in FIG. 3, and a flexible translucent impression sheet 46 is similarly wound upon lower roller 26. Each sheet is unwindable counterclockwise (FIG. 3) from the rear of its roller in a downward direction below bracket 14, 16 to a lower extended position, such as shown in FIG. 1 or FIG. 5, wherein the sheets are substantially parallel and adjacent each other, with backing sheet 44 being located adjacent structural wall W. Inasmuch as sheet 44 preferably is substantially thicker than sheet 46, e.g. two to three times thicker, this desired adjacent relation is readily achieved as the sheets maintain their adjacent positions during unwinding.

Referring now to FIG. 6, the flexible opaque backing sheet 44 preferably includes a textural layer impregnated with a dry but tacky cementitious substance forming a pressure sensitive but non-removable, flexible adhesive surface or layer facing sheet 46, and preferably is made of adhesively coated black oil cloth. Thus, sheet 44 preferably is of three ply construction, including the shiny black rear plastic layer 48 bonded to the intermediate woven fabric layer 50 which is, in turn, impregnated with the cementitious substance forming layer or surface 52.

While various formulations can be used, the cementitious substance preferably consists essentially of an alcohol diluted, flexible setting gasket cement. One formulation which has been successfully used in practicing the present invention is five parts of Permatex Super 300 Form-A-Gasket Cement diluted with three parts of denatured alcohol, 200 proof. This cement is a product of Permatex Company, Inc., Brooklyn, N.Y. and according to the manufacturer, is a mixture of synthetic resins, polymerized vegetable oils, inert matter and suitable solvents, which mixture drys slowly, sets to a flexible state, is soluble in alcohol, can be applied to the surface to be treated by brush or gun, has a temperature range from −65 to 425 degrees, F. and a pressure range up to 5,000 p.s.i., and is resistant to high detergent oils and lubricants, jet fuels, heat transfer oils, glycols, mild salt solutions, water, steam, aliphatic hydrocarbons, diester lubricants, anti-freeze mixtures, petroleum base hydraulic fluids and aviation fuels.

The purpose of diluting the gasket cement with alcohol is to dry out the cement enough to prevent it from being too soft and too sticky, as well as to thin the cement so that it may be sprayed readily onto layer 50. If left undiluted, the cement would have a tendency to come off when stripping sheet 44 off sheet 46 or to spread impressing sheet 44 against sheet 46, and would be too thick to be sprayed in place easily.

Another formulation which has been successfully used in practicing the invention is Polystixit #1578 polyethylene adhesive. This is a product of Adhesive Products Corp., Brooklyn, N.Y., and according to the manufacturer, is a flexible setting, water based, pressure sensitive latex which has excellent affinity for bonding polyethylene to porous materials.

Other suitable formulations are of the so called "masking tape" type of flexible setting adhesive. One such formulation has the following composition:

| Ingredient: | Parts by volume |
|---|---|
| Rubber (neutral latex 70%) | 100 |
| Castor oil | 50 |
| Rosin | 5 |

In preparing this formulation, the rosin is heated in the castor oil until dissolved. The solution is then added to the latex.

Another suitable "masking tape" type of adhesive, which is described in detail in U.S. Patent 1,933,026, has the following composition:

| Ingredient: | Parts by volume |
|---|---|
| Pale crepe | 50 |
| Tube reclaim | 50 |
| Camar RS | 30 |
| Bardol | 10 |
| Zinc oxide | 25 |
| Lithopone | 75 |

In making up this formulation, the various ingredients first are milled together, and then "cut" with a suitable solvent (benzol or naphtha) to the desired consistency, before spreading.

Whichever of these cements are employed, however, it is important that the cementitious layer 52 be allowed to dry thoroughly on the porous woven fabric layer 50 prior to contact with the impression sheet 46. This will ensure removability of such impression sheet, while permitting the adhesive layer to remain intact on the fabric layer.

Continuing with FIG. 6, the flexible translucent impression sheet 46 preferably is made of pigmented plastic such as white polyethylene or polyvinyl chloride, and has a thickness preferably ranging from about 8 to about 10 mils. In addition, the front or right hand surfaces of sheet 46 is reflective for a purpose to be described below.

Referring now to FIG. 5, when both sheets 44 and 46 are unwound to the desired lower extended position shown, such as by grasping their lower weighted ends 54, 56 respectively, or handles (not shown) which may be attached thereto, if desired, the adhesive front surface 52 of sheet 44 faces the rear surface of sheet 46. Hence, the rear surface of sheet 46 can be removably adhered to such front surface of sheet 44 by pressure selectively applied against the front surface of sheet 46, such as by a stylus, not shown, in order to form opaque indicia, such as the letters A, B, C illustrated, which are visible through the adhered portions of translucent sheet 46. While such indicia can be formed readily by so impressing sheet 46 on sheet 44, their opacity and hence visibility, can be enhanced by pressing both sheets against the adjacent rigid supporting surface, such as structural wall W. When it is desired to erase the indicia, this can be accomplished readily by stripping sheet 46 from sheet 44, whereupon the inventive appliance 10 is ready for reuse.

As is now evident, the inventive device is a more effective and efficient replacement for a conventional blackboard, eliminating not only such blackboard, but also the chalk, together with the time effort and dust problems associated with erasing the blackboard.

In addition, the inventive device is versatile in that either sheet 44 or 46 is useable individually. For example, as shown in FIG. 7, backing sheet 44 can be used, when unwound alone to a lower extended position, to expose adhesive surface 52 to which various non-adhesive media can be removably adhered, by pressing such media against such adhesive surface. In FIG. 7, these media take the geometric form of circular quadrants 58 preferably made of pigmented plastic like impression sheet 46, and are readily removable by stripping from sheet 44.

Likewise, impression sheet 46 can be unwound to a desired lower extended position, with or without unwinding backing sheet 44, to expose its front surface for use as a photographic viewing screen. As noted above, the front surface of the preferably white, albeit translucent, sheet 46 is sufficiently reflective for this purpose.

Referring once again to FIGS. 1 and 7, it is to be noted that the lateral margins of adhesive surface 52 of backing sheet 44 preferably are covered with thin flexible strips 60 for a short distance upwardly from their lower ends. These strips may be made of plastic such as sheet 46 and removably adhered by pressure to surface 52 for relieving pressure on the central area of such surface, when sheet 44 is rolled up for an extended period. This effectively prevents any self-adhesion of the lower portion of the wound sheet 44 to the underlying portion which might interfere with the unwinding operation. At the same time, the strips 60 do not interfere with the desired operation of the inventive device.

It now is evident how the invention accomplishes its various objects, and the numerous advantages of the invention likewise are apparent. While the invention has been described and illustrated herein by reference to a single preferred embodiment, it is to be understood that various changes and modifications may be made by those skilled in the art without departing from the inventive concept, the scope of which is to be determined by the appended claims.

What is claimed is:

1. A visual teaching device comprising spaced bracket means adapted to be secured to a support such as a structural wall, a pair of rollers rotatably mounted in said bracket means in laterally spaced substantially parallel relation, a flexible translucent impression sheet wound upon one of said rollers, a flexible opaque backing sheet wound upon the other of said rollers, each of said sheets having a free end and being unwindable by said free end from its roller to an extended position substantially parallel and adjacent to the other of said sheets, and said backing sheet having a pressure sensitive but non-removable, adhesive surface facing said impression sheet in said position, and to which adhesive surface the adjacent surface of said impression sheet can be removably adhered by pressure selectively applied against the opposite surface of said impression sheet, such as by a stylus, to form indicia visible through the adhered portions of said impression sheet, and which indicia can be erased by stripping said impression sheet from said backing sheet.

2. The teaching device of claim 1 wherein said impression sheet is made of a pigmented plastic and its opposite surface is sufficiently reflective for use as a photographic viewing screen when said impression sheet is unwound to an extended position to expose said opposite surface.

3. The teaching device of claim 1 wherein said backing sheet includes a textural layer impregnated with a dry but tacky cementitious substance forming said adhesive surface, said backing sheet being useable, when unwound alone to an extended position, to expose said adhesive surface, to which various non-adhesive media can be removably adhered by pressing said media against said adhesive surface.

4. A visual aid teaching device comprising an elongated housing including a pair of longitudinally spaced brackets connected by an elongated rear wall adapted to be secured to a support such as a structural wall, a pair of elongated rollers rotatably mounted in said brackets in laterally spaced, substantially parallel relation, with one of said rollers being located adjacent one longitudinal margin of said rear wall, a flexible translucent impression sheet wound upon said one roller, and a flexible opaque backing sheet wound upon the other of said rollers, each of said sheets having a free end and being unwindable by said free end from the rear of its roller in the same lateral direction beyond said one margin to an extended position substantially parallel and adjacent to the other of said sheets, said backing sheet having a pressure sensitive but non-removable, adhesive front surface facing the rear surface of said impression sheet in said position, and to which front surface the rear surface of said impression sheet can be removably adhered by pressure selectively applied against the front surface of said impression sheet, such as by a stylus, to form indicia visible through the adhered portions of said impression sheet, and which indicia can be erased by stripping said impression sheet from said backing sheet.

5. The teaching device of claim 4 wherein said impression sheet is made of a pigmented plastic and its opposite surface is sufficiently reflective for use as a photographic viewing screen when said impression sheet is unwound to an extended position to expose said opposite surface.

6. The teaching device of claim 5 wherein said backing sheet includes a textural layer impregnated with a dry but tacky cementitious substance forming said adhesive surface, said backing sheet being useable, when unwound alone to an extended position, to expose said adhesive surface, to which various non-adhesive media can be removably adhered by pressing said media against said adhesive surface.

7. A visual aid teaching device comprising a horizontally elongated housing including a pair of longitudinally spaced brackets connected by a top wall and a rear wall adapted to be secured to a support such as an upright structural wall, a pair of elongated, self-winding rollers rotatably mounted in said brackets in vertically spaced, substantially parallel horizontal relation, a flexible translucent impression sheet wound upon the lower roller and a flexible, opaque backing sheet wound upon the upper roller, each of said sheets having a free end and being unwindable by said free end from the rear of its roller in a downward direction below said housing to a lower extended position substantially parallel and adjacent to the other of said sheets, said backing sheet having a pressure sensitive but non-removable, adhesive front surface facing the rear surface of said impression sheet in said position and to which front surface the rear surface of said impression sheet can be removably adhered by pressure selectively applied against the front surface of said impression sheet, such as by a stylus, to form indicia visible through the adhered portions of said impression sheet from said backing sheet.

8. The teaching device of claim 7 wherein said impression sheet is made of pigmented polyethylene or polyvinyl chloride plastic and its front surface is sufficiently reflective for use as a photographic viewing screen when said impression sheet is unwound to a lower extended position to expose said front surface.

9. The teaching device of claim 7 wherein said backing sheet includes a woven fabric layer impregnated with a dry but tacky cementitious substance forming said adhesive front surface, said backing sheet being useable, when unwound alone to a lower extended position, to expose said adhesive front surface, to which various non-adhesive media can be removably adhered by pressing said media against said adhesive front surface.

10. In combination with an upright structural wall, a visual aid teaching device comprising a horizontally elongated housing including a pair of longitudinally spaced brackets connected by a top wall and a rear wall secured to said structural wall, a pair of elongated, self-winding rollers rotatably mounted in said brackets in vertically spaced, substantially parallel horizontal relation, a flexible and translucent, plastic impression sheet wound upon the lower roller, and a flexible, opaque backing sheet wound upon the upper roller, each of said sheets having a free end and being unwindable by said free end from the rear of its roller in a downward direction below said housing to a lower extended position substantially parallel and adjacent to the other of said sheets, with said backing sheet being located adjacent said structural wall, said backing sheet including a textural layer impregnated with a dry but tacky, cementitious substance forming a pressure sensitive but nonremovable adhesive front surface facing said impression sheet in said position, and to which adhesive surface the rear surface of said impression sheet can be removably adhered by pressure selectively applied against the front surface of said impression sheet such as by a stylus, to form indicia visible through the adhered portions of said impression sheet, and which indicia can be erased by stripping said impression sheet from said backing sheet.

References Cited
UNITED STATES PATENTS

| | | | |
|---|---|---|---|
| 1,555,642 | 9/1925 | Deutsch | 35—66 |
| 1,706,046 | 3/1929 | Tisdale. | |
| 2,596,890 | 5/1952 | Dechert | 35—66 |

EUGENE R. CAPOZIO, *Primary Examiner.*

H. S. SKOGQUIST, *Assistant Examiner.*